(12) United States Patent
Tapaninen

(10) Patent No.: US 7,027,496 B2
(45) Date of Patent: Apr. 11, 2006

(54) METHOD AND APPARATUS PROVIDING UNBIASED SIGNAL-TO-NOISE RATIO ESTIMATION AND ITS APPLICATION TO DISCONTINUOUS TRANSMISSION DETECTION

(75) Inventor: Jukka Tapaninen, San Diego, CA (US)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 10/408,057

(22) Filed: Apr. 4, 2003

(65) Prior Publication Data

US 2004/0196891 A1   Oct. 7, 2004

(51) Int. Cl.
  *H04B 15/00* (2006.01)
  *H04B 17/00* (2006.01)
(52) U.S. Cl. .................. 375/227; 375/346; 375/147
(58) Field of Classification Search ............... 375/316, 375/346, 348, 341, 224, 227, 130, 140, 147, 375/148
See application file for complete search history.

(56) References Cited

U.S. PATENT DOCUMENTS

| | | | |
|---|---|---|---|
| 5,546,429 A * | 8/1996 | Chiasson et al. | 375/341 |
| 6,374,118 B1 | 4/2002 | Toskala et al. | 455/522 |
| 6,690,944 B1 * | 2/2004 | Lee et al. | 455/522 |
| 2004/0153950 A1 * | 8/2004 | Tapaninen et al. | 714/776 |

OTHER PUBLICATIONS

"Physical Layer Standard for cdma2000 Spread Spectrum Systems, Release A"; 3$^{rd}$ Generation Partnership Project 2 "3GPP2" C.S0002-A; Jun. 9, 2000.
"Physical Layer Standard for cdma2000 Spread Spectrum Systems"; 3$^{ed}$ Generation Partnership Project 2 "3GPP2" C.S0002-O, Version 1.0; Jul. 1999.

* cited by examiner

*Primary Examiner*—Kevin Burd
(74) *Attorney, Agent, or Firm*—Harrington & Smith, LLP

(57) ABSTRACT

Disclosed are a method and an apparatus to estimate a signal-to-noise ratio (SNR) of a signal. The method includes sampling the signal, correlating and channel estimating the sampled signal, symbol combining the correlated and channel estimated signal, such as by using a maximal-ratio combining technique, estimating pilot channel and noise power to obtain a combined pilot power and noise variance estimate and inputting the symbol combined signal and the pilot power and noise variance estimate to an Eb/Nt (SNR) estimator. The method further includes, in the Eb/Nt estimator, subtracting a noise term, multiplied by a constant, from the combined signal power and computing a ratio of the unbiased signal power to the noise power to obtain an unbiased (Eb/Nt) estimate. Having obtained obtain the unbiased (Eb/Nt) estimate, the method may integrate the unbiased (Eb/Nt) estimate for a frame duration and compare the integrated unbiased (Eb/Nt) value to a predetermined threshold value to make a decision as to whether the frame was a transmitted frame or an untransmitted (DTX) frame.

25 Claims, 3 Drawing Sheets

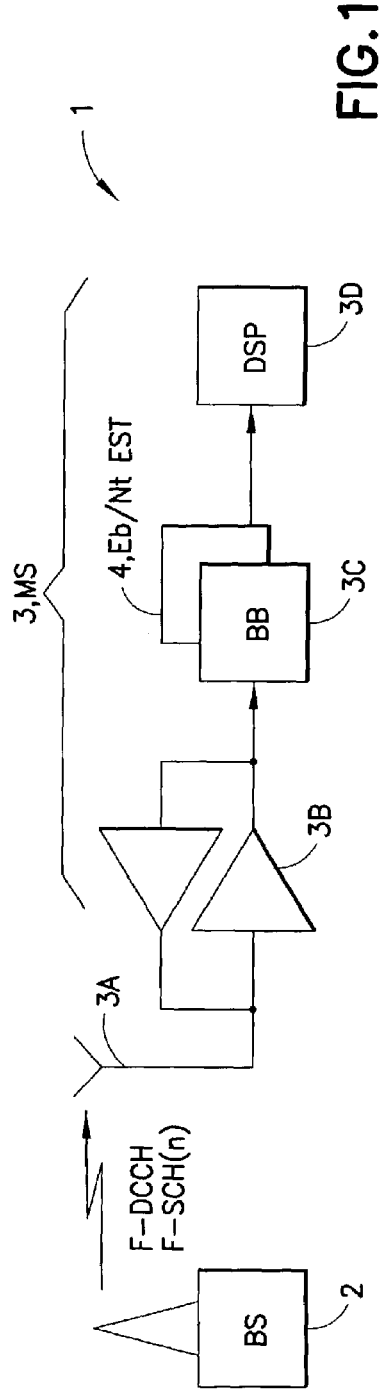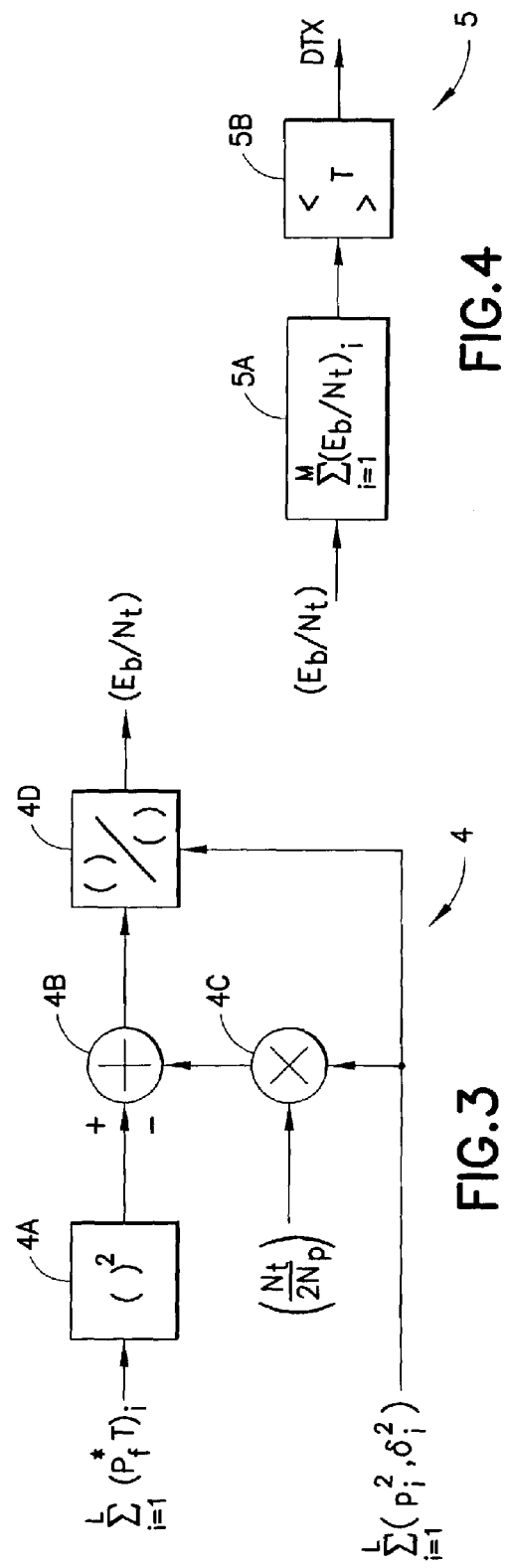

METHOD AND APPARATUS PROVIDING UNBIASED SIGNAL-TO-NOISE RATIO ESTIMATION AND ITS APPLICATION TO DISCONTINUOUS TRANSMISSION DETECTION

TECHNICAL FIELD

This invention relates generally to Code Division, Multiple Access (CDMA) mobile communication systems and, more specifically, relates to systems where a mobile station, such as a cellular telephone, is required to measure the signal-to-noise ratio (SNR or (Eb/Nt)) of a forward link channel (a channel transmitted from a base site or base station to the mobile station), and also to those systems that use discontinuous transmission (DTX).

BACKGROUND

A current CDMA standard, IS-2000-2, "Physical Layer Standard for cdma2000 Spread Spectrum Systems", release 0, July 1999, allows the base station to disable a forward link channel transmission on a frame-by-frame basis. This is referred to herein as discontinuous transmission (DTX). However, information as to whether a particular frame was transmitted or was not transmitted is not known to the Mobile Station. In IS-2000-2 the following channels can be discontinuous: the Forward Dedicated Control Channel (F-DCCH), the Forward Supplemental Channel 1 (F-SCH1), and the Forward Supplemental Channel 2 (F-SCH2).

Several algorithms executed by the mobile station require information as to whether a frame was actually transmitted. In the context of this patent application this will be referred to as a "DTX detection" problem. Three examples that illustrate the DTX detection problem follow.

In a first example, when the forward link power control is enabled on the F-DCCH or the F-SCHn (n=1,2), the outer power control loop updates the current setpoint (operating point) based on the frame error information (CRC). However, if the frame was not transmitted the mobile station should not update the current setpoint. In order to accomplish this the mobile station needs to be able to detect whether actual frame transmission took place.

In a second example, the IS2000 Release A standard (IS-2000-2, "Physical Layer Standard for cdma2000 Spread Spectrum Systems", release A, Jun. 9, 2000) specifies a forward link power control mode on F-DCCH (QIB (Quality Indicator Bit) power control). This procedure requires the detection of the F-DCCH frame transmission (DTX detection).

The IS2000 Release A standard also allows the power control subchannel on the forward link to be transmitted on the F-FCH or the F-DCCH, based on a parameter FPC_PRI_CHAN. When the power control subchannel is transmitted on the F-DCCH, the mobile station supervision procedures require DTX detection.

Prior to this invention, a satisfactory technique for solving the DTX detection problem was not available.

SUMMARY OF THE PREFERRED EMBODIMENTS

The foregoing and other problems are overcome, and other advantages are realized, in accordance with the presently preferred embodiments of these teachings.

This invention provides both a method and an apparatus to determine the DTX status of a frame (i.e., whether the frame is transmitted/not transmitted) based on the estimation of (Eb/Nt). An enhanced (Eb/Nt) estimator is obtained by noting that the signal part (Eb) and the noise part (Nt) of the (Eb/Nt) estimate contain certain equivalent terms. By subtracting these equivalent terms from the signal estimate, an improved (Eb/Nt) estimator is obtained, also referred to herein as an "unbiased (Eb/Nt) estimator". The unbiased (Eb/Nt) estimator is more accurate than the original (Eb/Nt) estimate due to reduced variance. As but one important application of the unbiased (Eb/Nt) estimator, DTX detection of frame transmission can be accomplished.

A method is disclosed to estimate a signal-to-noise ratio (SNR) of a signal. The method includes sampling the signal, correlating and channel estimating the sampled signal, symbol combining the correlated and channel estimated signal, such as by using a maximal-ratio combining technique, estimating pilot channel and noise power to obtain a combined pilot power and noise variance estimate and inputting the symbol combined signal and the pilot power and noise variance estimate to an (Eb/Nt) estimator. The method further includes, in the (Eb/Nt) estimator, subtracting a noise term, multiplied by a constant, from the combined signal power and computing a ratio of the unbiased signal power to the noise power to obtain an unbiased (Eb/Nt) estimate.

Having thus obtained the unbiased (Eb/Nt) estimate, and in accordance with a non-limiting further embodiment of this invention, the method integrates the unbiased (Eb/Nt) estimate for a frame duration and compares the integrated unbiased (Eb/Nt) value to a predetermined threshold value to make a decision as to whether the frame was a transmitted frame or an untransmitted (DTX) frame.

Apparatus for accomplishing the method is also disclosed, as is a CDMA mobile station that operates in accordance with the method.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 is a simplified block diagram of a CDMA system having a base station and a mobile station that are suitable for practicing this invention;

FIG. 3 is a block diagram of the Eb/Nt estimator of FIGS. 1 and 2;

FIG. 4 is a block diagram of the DTX detection algorithm of FIG. 2; and

DETAILED DESCRIPTION OF THE PREFERRED EMBODIMENTS

It is noted at the outset that while this invention is described in the context of a CDMA system, and more specifically as a cdma2000 Spread Spectrum system, the method and apparatus of this invention are not restricted to only these types of systems. Thus, while the invention will be described in the context of a CDMA system as a presently preferred embodiment, the teachings of this invention provide a general approach to realizing an improved signal-to-noise ratio estimation through the use of an unbiased (Eb/Nt)

estimator, and further provide a general approach to using the signal-to-noise ratio estimate for, as one non-limiting example, DTX detection.

FIG. 1 is a simplified block diagram of a CDMA system 1 that includes a base station (BS) 2 (typically one of many) that is capable of transmitting a forward link channel, such as a F-DCCH, a F-SCH1 and a F-SCH2, to a mobile station (MS) 3. The MS 3 includes an antenna 3A coupled to a transceiver 3B. An output of the receiver portion of the transceiver 3B is connected to a baseband (BB) section 3C that includes the improved, unbiased (Eb/Nt) estimator 4 in accordance with this invention. A controller, such as a digital signal processor (DSP) 3D, has an input connected to an output of the unbiased (Eb/Nt) estimator 4 of the baseband section 3C, and is enabled to make, as a non-limiting example, a DTX determination there from. The DTX determination can then be employed by the controller when executing an algorithm, such as one of the power control-related algorithms discussed above.

Figure 2:
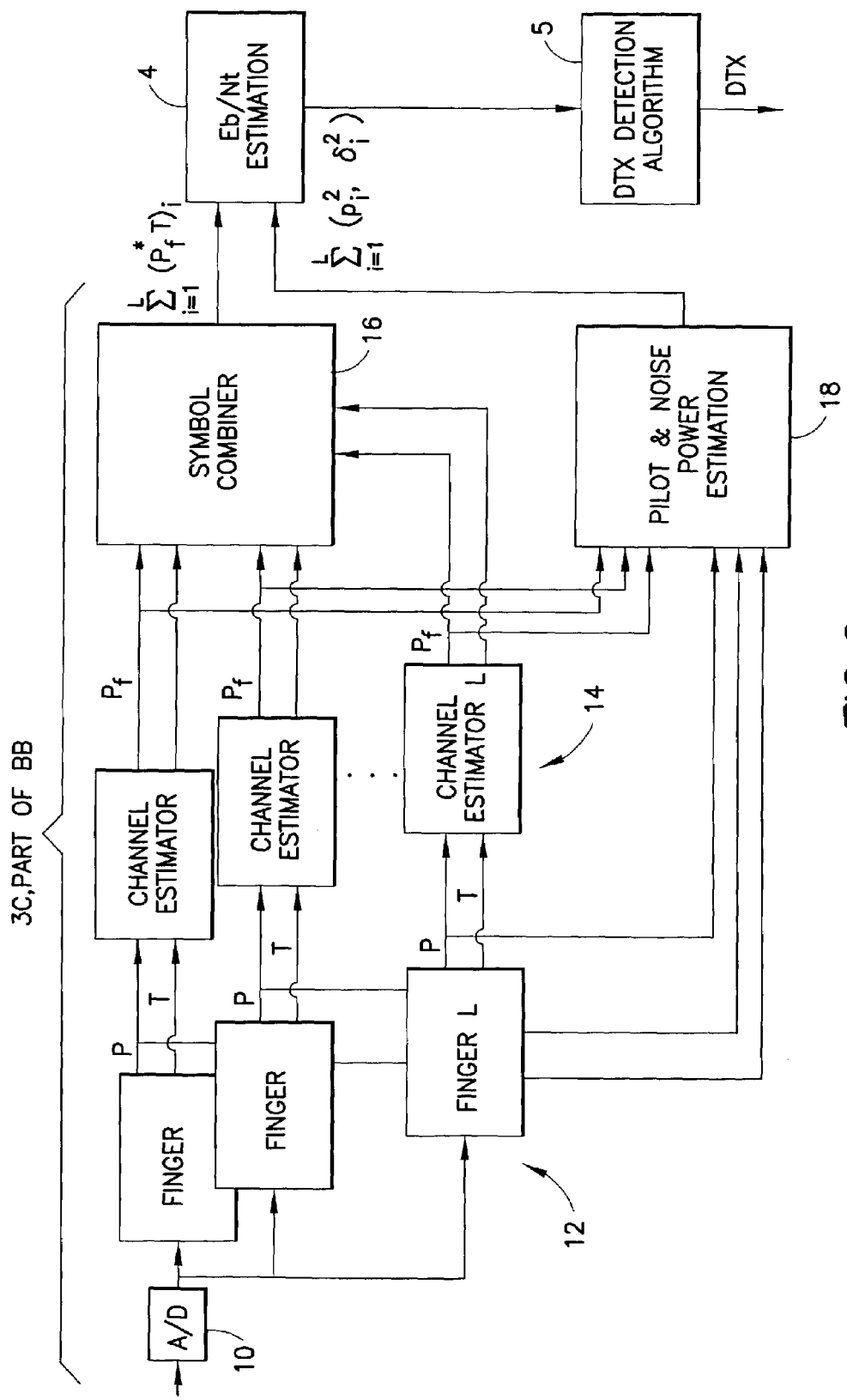
FIG. 2 is a block diagram that shows in greater detail the baseband section and the Eb/Nt estimator of FIG. 1, and also a DTX detection algorithm.

A detailed analysis of the calculations performed by the unbiased (Eb/Nt) estimator is provided. Reference is also made to FIG. 2, which shows in further detail a portion of the baseband section 3C, the Eb/Nt estimator 4, shown in greater detail in FIG. 3, and a DTX detection algorithm 5, shown in greater detail in FIG. 4. The DTX detection algorithm may be assumed, for the purposes of this invention, to form a part of the controller 3D.

Briefly, FIG. 2 shows a portion of a CDMA receiver. An analog received signal (RX) is sampled (10) and processed in multiple correlator blocks (fingers 12). The correlator result is combined in a symbol combiner (16) using, preferably, a maximal-ratio combining technique. The output of each finger is also processed in a pilot and noise power estimation block (18). The combined pilot power and noise variance estimate, together with the combiner (16) output, are the inputs to the (Eb/Nt) estimation block 4 that operates as described in detail below.

FIG. 3 illustrates the calculation of the unbiased estimate of (Eb/Nt) by the (Eb/Nt) estimation block 4 using Equation (13), as described below. The unbiased (Eb/Nt) estimator 4 operates by subtracting the noise term, multiplied by a constant, from the combined signal power, and computes the ratio of the unbiased signal power to the noise power.

FIG. 4 illustrates the DTX detection algorithm 5 based on the unbiased (Eb/Nt) estimation. Prior to the hypothesis testing the unbiased (Eb/Nt) estimate is integrated over M samples in block 5A so that the total integration length equals the frame duration. The DTX decision is based on a comparison of the integrated unbiased (Eb/Nt) value to a predetermined threshold.

Discussing FIGS. 2, 3 and 4 now in further detail, consider a received CDMA signal transmitted over an AWGN channel that is A/D converted by A/D converter 10 and sampled at one sample/chip at the input of a correlator (finger) 12, actually a multi-finger correlator as in RAKE receiver. A pilot symbol at the output of the finger 12 is given by:

$$P = kN_p\sqrt{2E_{cp}} + n_{p_I} + jn_{p_Q}, \quad (n_{p_I} n_{p_Q}) = N(0, \sqrt{k^2 N_p I_{oc}}), \quad (1)$$

where k is the combined A/D and AGC gain, $E_{cp}$ is pilot $E_c/I_{or}$, $I_{oc}$ is the AWGN channel noise and $N_p$ is the pilot symbol correlation length. The combined A/D and AGC gain k is $$k^2 = \frac{\alpha}{I_{or} + I_{oc}}, \quad (2)$$

where $\alpha$ is a constant.

Assume the pilot symbol is further filtered with a filter of unity gain and a noise reduction factor $M_p$ prior to phase correction. This yields at the outputs of channel estimators 14:

$$P_f = kN_p\sqrt{2E_{cp}} + n_{p_I} + jn_{p_Q}, \quad (n_{p_I} n_{p_Q}) = N(0, \sqrt{k^2 (N_p/M_p) I_{oc}}), \quad (3)$$

Assume further the presence of a quadrature phase shift key (QPSK) modulated traffic channel. The correlator 12 output of the traffic signal is:

$$T = kN_t\sqrt{E_{ct}} + n_{t_I} + j(kN_t\sqrt{E_{ct}} + n_{t_Q}), \quad (n_{t_I} n_{t_Q}) = N(0, \sqrt{k^2 N_t I_{oc}}), \quad (4)$$

where $N_t$ is the traffic symbol correlation length. The data bit is ignored from this point forward, since for this analysis one is interested only in the amplitude/power of the signal, and the sign of the data bit is of no interest.

At the symbol combiner 16 the complex traffic signal is multiplied by the complex conjugate of the pilot symbol. The result is a complex traffic symbol, which is demultiplexed to obtain a scalar stream of traffic symbols. The first traffic symbol (real part of the demodulated complex QPSK symbol) is $$\begin{aligned}\mathrm{Re}\{P_f^* T\} &= \mathrm{Re}\{(kN_p\sqrt{2E_{cp}} + n_{p_I} - jn_{p_Q}) \\ &\quad (kN_t\sqrt{E_{ct}} + n_{t_I} + j(kN_t\sqrt{E_{ct}} + n_{t_Q}))\} \\ &= k^2 N_p N_t\sqrt{2E_{cp}E_{ct}} + kN_p\sqrt{2E_{cp}}\, n_{t_I} + \\ &\quad kN_t\sqrt{E_{ct}}(n_{p_I} + n_{p_Q}) + n_{p_I} n_{t_I} + n_{p_Q} n_{t_Q},\end{aligned} \quad (5)$$

and similarly for the following symbol (imaginary part of the complex traffic symbol).

The energy of the traffic symbol is obtained by taking the expected value of the square of Equation (5). By noting that the cross terms involving noise vanish due to an expectation operation, Equation (5) yields $$E\{(\mathrm{Re}\{P^*_f T\})^2\} = 2k^4(N_p^2 N_t^2 E_{cp} E_{ct} + (N_p^2 N_t E_{cp} + (N_p/M_p)N_t^2 E_{ct})I_{oc} + (N_p/M_p)N_t I_{oc}^2). \quad (6)$$

The energy of the complex traffic symbol is given by:

$$\begin{aligned}(pt)^2 &= E\{(\mathrm{Re}\{P^*_f T\})^2 + (\mathrm{Im}\{P^*_f T\})^2\} = 4k^4 \\ &\quad (N_p^2 N_t^2 E_{cp} E_{ct} + (N_p^2 N_t E_{cp} + (N_p/M_p)N_t^2 E_{ct})I_{oc} + \\ &\quad (N_p/M_p)N_t I_{oc}^2).\end{aligned} \quad (7)$$

The energy of the pilot symbol is obtained similarly in the pilot and noise power estimation block 18, from Equation (3), as:

$$p^2 = E\{(P^*_f P_f)\} = 2k^2(N_p^2 E_{cp} + (N_p/M_p)I_{oc}). \quad (8)$$

There are several possible techniques to estimate the noise variance. A straightforward method calculates the square of the difference between the current and the previous pilot symbol. This yields a result that equals twice the variance of the pilot symbol:

$$\sigma^2 = 4k^2 N_p I_{oc}. \quad (9)$$

The (Eb/Nt) estimation block 4 operates using Equations (7), (8) and (9) as follows:

$$\frac{E_b}{N_t} = \frac{(pt)^2}{p^2\sigma^2} = \qquad (10)$$

$$\frac{4k^4(N_p^2 N_t^2 E_{cp} E_{ct} + (N_p^2 N_t E_{cp} + (N_p/M_p)N_t^2 E_{ct})I_{oc} + (N_p/M_p)N_t I_{oc}^2)}{8k^4(N_p^3 E_{cp} I_{oc} + (N_p^2/M_p)I_{oc}^2)}.$$

It can be seen that the first term in the numerator of Equation (10) is the actual signal, and that the three remaining terms are due to the noise ($I_{oc}$) which bias the actual signal. In most practical systems, typically ($N_p \geq N_t$) and ($M_p \gg 1$). This implies that the second term in the numerator of Equation (10) is the dominant bias term.

Multiplying the denominator of Equation (10) by ($N_t/(2N_p)$) yields $$\frac{N_t}{2N_p}(p^2\sigma^2) = 4k^4(N_p^2 N_t E_{cp} I_{oc} + (N_t N_p/M_p)I_{oc}^2). \qquad (11)$$

It can be seen by an inspection of Equations (10) and (11) that the quantity in Equation (11) equals the sum of the second and the fourth term of the numerator of Equation (10). Therefore, by subtracting the quantity shown in Equation (11) from the numerator of Equation (10), as depicted in FIG. 3, one reduces the bias of the (Eb/Nt) estimate. This yields $$\left(\frac{E_b}{N_t}\right)_{unbias} = \frac{(pt)^2 - \left(\frac{N_t}{2N_p}\right)(p^2\sigma^2)}{p^2\sigma^2} \qquad (12)$$

$$= \frac{4k^4(N_p^2 N_t^2 E_{cp} E_{ct} + (N_p/M_p)N_t^2 E_{ct} I_{oc})}{8k^4(N_p^3 E_{cp} I_{oc} + (N_p^2/M_p)I_{oc}^2)}.$$

Equation (12), implemented with blocks 4A, 4B, 4C and 4D in FIG. 3, shows the basis of the calculation of the unbiased estimate of (Eb/Nt). It can be seen that the dominant bias term is removed from the signal estimate. In practical systems the remaining bias is small compared to the actual signal, and can essentially be ignored.

The unbiased estimate of (Eb/Nt) shown in Equation (12) may then be used by the DTX detection algorithm 5 to identify if the frame transmission has taken place. This is accomplished by estimating the (Eb/Nt) over the frame duration B (block 5A of FIG. 4), and comparing the result to a predefined threshold (T) in block 5B. If the (Eb/Nt) estimate exceeds the threshold a decision is made that the frame was transmitted. Otherwise the frame is declared to have not been transmitted. The optimal decision threshold can be derived using simulations, together with laboratory and/or field testing. The value of (T) is typically constant for a fixed parameter configuration. That is, for a certain set of parameters such as data rate (bits/sec) and channel type (e.g., F-FCH, F-SCH1), a predetermined threshold value can be determined and tabulated.

By using Equation (12) instead of Equation (10) in the threshold comparison of block 5B (hypothesis testing), the miss and false alarm rates of the detection process are considerably reduced, thereby yielding improved performance.

In the case where a RAKE receiver is used, so that a finger is assigned to each of the multi-paths, two embodiments to obtain the unbiased estimate for a total (Eb/Nt) are disclosed. The first embodiment subtracts the combined bias from the total signal power, which is calculated by using maximal-ratio combining:

$$\left(\frac{E_b}{N_t}\right)_{unbias} = \frac{\left(\sum_{i=1}^{L}(pt)_i\right)^2 - \left(\frac{N_t}{2N_p}\right)\left(\sum_{i=1}^{L}p_i^2\sigma_i^2\right)}{\left(\sum_{i=1}^{L}p_i^2\sigma_i^2\right)}, \qquad (13)$$

where L denotes the number of assigned fingers (see FIG. 2). The second embodiment subtracts the bias from each finger separately prior to combining:

$$\left(\frac{E_b}{N_t}\right)_{unbias} = \frac{\sum_{i=1}^{L}\left((pt)_i^2 - \left(\frac{N_t}{2N_p}\right)p_i^2\sigma_i^2\right)}{\left(\sum_{i=1}^{L}p_i^2\sigma_i^2\right)}. \qquad (14)$$

For practical purposes the first embodiment is preferred, as it uses the output of the symbol combiner 16, where it is assumed that data is combined by using a maximal-ratio combining technique.

Figure 5:
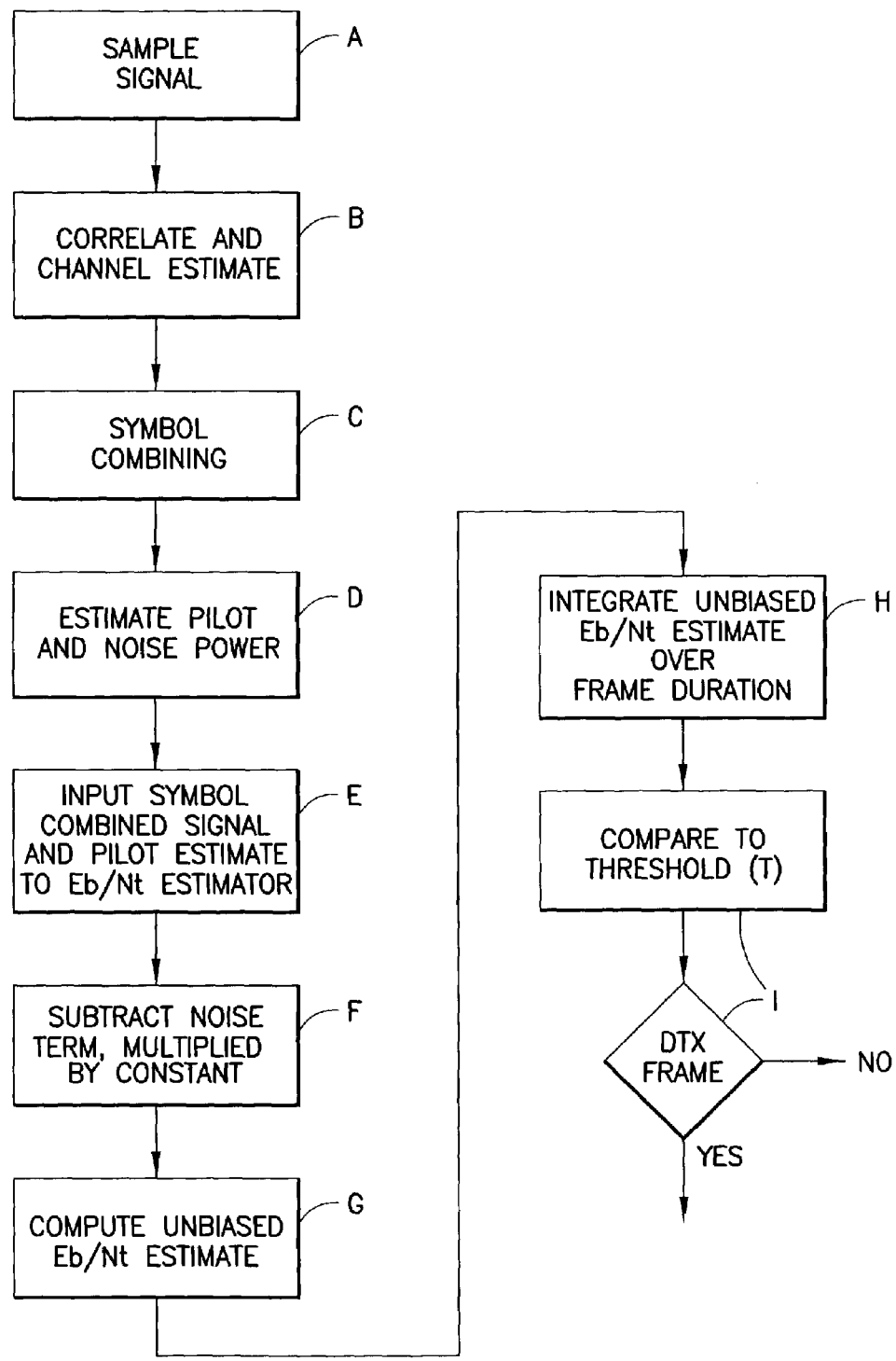
FIG. 5 is a logic flow diagram in accordance with a method of this invention.

Referring to FIG. 5, a method is disclosed to estimate a signal-to-noise ratio (SNR) of a signal. The method includes sampling the signal at block A, correlating and channel estimating the sampled signal at block B, symbol combining the correlated and channel estimated signal, such as by using a maximal-ratio combining technique, at block C, estimating pilot channel and noise power to obtain a combined pilot power and noise variance estimate (block D) and inputting the symbol combined signal and the pilot power and noise variance estimate to an (Eb/Nt) estimator at block E. The method further includes, in the (Eb/Nt) estimator, subtracting a noise term, multiplied by a constant, from the combined signal power (block F) and computing a ratio of the unbiased signal power to the noise power to obtain an unbiased (Eb/Nt) estimate (block G).

Having thus obtained the unbiased (Eb/Nt) estimate, and in accordance with a non-limiting further embodiment of this invention, the method integrates the unbiased (Eb/Nt) estimate for a frame duration (block H) and compares the integrated unbiased (Eb/Nt) value to a predetermined threshold value to make a decision as to whether the frame was a transmitted frame or an untransmitted (DTX) frame (block I). Mobile station 3 power control processing may then be based on the DTX decision.

The method can be performed in software, hardware, or in a combination of software and hardware.

Also disclosed above has been a CDMA mobile station 3 operable with a base station 2 that is capable of transmitting a signal on a frame-by-frame basis in accordance with a DTX technique. The mobile station 3 includes a receiver that is operable during a frame time and, coupled to the receiver, the unbiased (Eb/Nt) estimator 4. A power controller, such as the controller 3D, is coupled to the unbiased (Eb/Nt) estimator 4 for making a power control decision, such as whether or not to update a setpoint, in accordance with at least a DTX status of a frame (i.e., was the frame transmitted or not transmitted by the base station 2). The DTX status is determined based on a comparison of an output of the unbiased (Eb/Nt) estimator to the threshold (T) value.

As was noted above, the improved technique for estimating the (Eb/Nt) in an unbiased manner, in accordance with this invention, is not limited for use with CDMA systems, and furthermore the unbiased (Eb/Nt) estimation is not limited for use in performing DTX detection, nor is it limited for use during mobile station 3 power control processing.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims, which follow.

What is claimed is:

1. A method to estimate a signal-to-noise ratio (SNR) of a signal, compnsing:
    sampling the signal;
    correlating and filtering the sampled signal;
    symbol combining the correlated and filtered signal;
    estimating pilot channel and noise power to obtain a combined pilot power and noise variance estimate;
    inputting the symbol combined signal and the pilot power and noise variance estimate to an (Eb/Nt) estimator and subtracting a noise term, multiplied by a constant, from the combined signal power; and
    computing a ratio of the unbiased signal power to the noise power to obtain an unbiased (Eb/Nt) estimate, to determine a status of a received signal for making at least one discontinuos transmission (DTX) decision within a communication terminal as to whether a frame was a transmitted frame or an unstransmitted frame.

2. A method as in claim 1, further comprising:
    integrating the unbiased (Eb/Nt) estimate for a frame duration; and
    comparing the integrated unbiased (Eb/Nt) value to a predetermined threshold value to make a DTX decision as to whether the frame was a transmitted frame or an untransmitted frame.

3. A method as in claim 2, where the method is executed by a CDMA mobile station, and further comprising considering the DTX decision during mobile station power control processing.

4. A method as in claim 1, where symbol combining comprises multiplying a complex traffic signal by the complex conjugate of the pilot signal, and demultiplexing to obtain a scalar stream of traffic signals.

5. A method as in claim 1, where computing the ratio of the unbiased signal power to the noise power to obtain an unbiased (Eb/Nt) estimate is performed in accordance with:

$$\left(\frac{E_b}{N_t}\right)_{unbias} = \frac{(pt)^2 - \left(\frac{N_t}{2N_p}\right)(p^2\sigma^2)}{p^2\sigma^2},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

6. A method as in claim 1, where correlating uses a correlator comprises of L fingers, and where computing the ratio of the unbiased signal power to the noise power to obtain an unbiased (Eb/Nt) estimate is performed in accordance with:

$$\left(\frac{E_b}{N_t}\right)_{unbias} = \frac{\left(\sum_{i=1}^{L}(pt)_i\right)^2 - \left(\frac{N_t}{2N_p}\right)\left(\sum_{i=1}^{L}p_i^2\sigma_i^2\right)}{\left(\sum_{i=1}^{L}p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

7. A method as in claim 1, where correlating uses a correlator comprises of L fingers, and where computing the ratio of the unbiased signal power to the noise power to obtain an unbiased (Eb/Nt) estimate is performed in accordance with:

$$\left(\frac{E_b}{N_t}\right)_{unbias} = \frac{\sum_{i=1}^{L}\left((pt)_i^2 - \left(\frac{N_t}{2N_p}\right)p_i^2\sigma_i^2\right)}{\left(\sum_{i=1}^{L}p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

8. A method as in claim 1, where symbol combining uses a maximal-ratio combining technique.

9. Apparatus to estimate a signal-to-noise ratio (SNR) of a signal, comprising:
    an analog to digital converter for sampling the signal;
    a correlator and channel filter for correlating and filtering the sampled signal;
    a symbol combiner for combining the correlated and filtered signal;
    an estimator for estimating pilot channel and noise power to obtain a combined pilot power and noise variance estimate; and
    an (Eb/Nt) estimator having inputs for inputting the symbol combined signal and the pilot power and noise variance estimate, said (Eb/Nt) estimator comprising a subtractor for subtracting a noise term, multiplied by a constant, from the combined signal power, and means for computing a ratio of the unbiased signal power to the noise power to obtain an unbiased (Eb/Nt) estimate for use in determining at least a status of a received signal for making at least one discontinuos transmission (DTX) decision within a communication terminal as to whether a frame was a transmitted frame or an untrasmitted frame.

10. An apparatus as in claim 9, further comprising:
an integrator for integrating the unbiased (Eb/Nt) estimate for a frame duration; and
a comparator for comparing the integrated unbiased (Eb/Nt) value to a predetermined threshold value to make a DTX decision as to whether the frame was a transmitted frame or an untransmitted frame.

11. An apparatus as in claim 10, where said apparatus forms a part of a CDMA mobile station, and further comprising a controller that considers the DTX decision when performing mobile station power control processing.

12. An apparatus as in claim 9, where said symbol combiner a multiplier for multiplying a complex traffic signal by the complex conjugate of the pilot signal, and a demultiplexer that outputs a scalar stream of traffic signals.

13. An apparatus as in claim 9, where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{(pt)^2 - \left(\frac{N_t}{2N_p}\right)(p^2\sigma^2)}{p^2\sigma^2},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

14. An apparatus as in claim 9, where said correlator comprises L fingers, and where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{\left(\sum_{i=1}^{L}(pt)_i\right)^2 - \left(\frac{N_t}{2N_p}\right)\left(\sum_{i=1}^{L}p_i^2\sigma_i^2\right)}{\left(\sum_{i=1}^{L}p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

15. An apparatus as in claim 9, where said correlator comprises L fingers, and where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{\sum_{i=1}^{L}\left((pt)_i^2 - \left(\frac{N_t}{2N_p}\right)p_i^2\sigma_i^2\right)}{\left(\sum_{i=1}^{L}p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

16. An apparatus as in claim 9, where said symbol combiner uses a maximal-ratio combining technique.

17. A CDMA mobile station operable with a base station capable of transmitting a signal on a frame-by-frame basis in accordance with a discontinuous transmission (DTX) technique, comprising:
a receiver for receiving the transmitted signal;
an analog to digital converter for sampling the received signal;
a correlator and channel filter for correlating and filtering the sampled signal;
a symbol combiner for combining the correlated and filtered signal;
an estimator for estimating pilot channel and noise power to obtain a combined pilot power and noise variance estimate;
an (Eb/Nt) estimator having inputs for inputting the symbol combined signal and the pilot power and noise variance estimate, said (Eb/Nt) estimator comprising a subtractor for subtracting a noise term, multiplied by a constant, from the combined signal power, and means for computing a ratio of an unbiased signal power to the noise power to obtain an unbiased (Eb/Nt) estimate;
an integrator for integrating the unbiased (Eb/Nt) estimate for a frame duration; and
a comparator for comparing the integrated unbiased (Eb/Nt) value to a predetermined threshold value to make a DTX decision as to whether the frame was a transmitted frame or an untransmitted frame.

18. A mobile station as in claim 17, further comprising a controller that considers the DTX decision when performing mobile station power control processing.

19. A mobile station as in claim 17, where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{(pt)^2 - \left(\frac{N_t}{2N_p}\right)(p^2\sigma^2)}{p^2\sigma^2},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

20. A mobile station as in claim 17, where said correlator comprises L fingers, and where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{\left(\sum_{i=1}^{L}(pt)_i\right)^2 - \left(\frac{N_t}{2N_p}\right)\left(\sum_{i=1}^{L}p_i^2\sigma_i^2\right)}{\left(\sum_{i=1}^{L}p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

21. A mobile station as in claim 17, where said correlator comprises L fingers, and where said (Eb/Nt) estimator computes the ratio of the unbiased signal power to the noise power to obtain the unbiased (Eb/Nt) estimate in accordance with:

$$\left(\frac{E_b}{N_t}\right)_{unbias} = \frac{\sum_{i=1}^{L}\left[(pt)_i^2 - \left(\frac{N_t}{2N_p}\right)p_i^2\sigma_i^2\right]}{\left(\sum_{i=1}^{L} p_i^2\sigma_i^2\right)},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

22. A mobile station as in claim 17, where said symbol combiner uses a maximal-ratio combining technique.

23. A mobile station as in claim 17, where the receiver receives one of a Forward Dedicated Control Channel (F-DCCH), a Forward Supplemental Channel 1 (F-SCH1), and a Forward Supplemental Channel 2 (F-SCH2).

24. A mobile station operable with a base station capable of transmitting a signal on a frame-by-frame basis in accordance with a discontinuos transmission (DTX) technique, comprising:
  a receiver operable during a frame time;
  coupled to said receiver, an unbiased (Eb/Nt) estimator; and
  a controller, coupled to said unbiased (Eb/Nt) estimator, for determining a DTX status of a frame based on an output of said unbiased (Eb/Nt) estimator; wherein the unbiased estimator is determined in accordance with:

$$\left(\frac{E_b}{N_t}\right)_{unbias} = \frac{(pt)^2 - \left(\frac{N_t}{2N_p}\right)(p^2\sigma^2)}{p^2\sigma^2},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

25. A CDMA mobile station operable with a base station capable of transmitting a signal on a frame-by-frame basis in accordance with a discontinuos transmission (DTX) technique, comprising:
  a receiver operable during a frame time;
  coupled to said receiver, an unbiased (Eb/Nt) estimator; and
  a power controller, coupled to said unbiased (Eb/Nt) estimator, for making a power control decision in accordance with at least a DTX status of a frame, the DTX status being determined based on a comparison of an output of said unbiased (Eb/Nt) estimator to a threshold value; wherein the unbiased estimator is determined in accordance with:

$$\left(\frac{E_b}{N_t}\right)_{unbias} = \frac{(pt)^2 - \left(\frac{N_t}{2N_p}\right)(p^2\sigma^2)}{p^2\sigma^2},$$

where $(pt)^2$ is the energy of a complex traffic signal, $p^2$ is the energy of a pilot symbol, $N_t$ and $N_p$ are traffic symbol correlation length and pilot symbol correlation length, respectively, and $\sigma^2$ is the noise variance.

* * * * *

UNITED STATES PATENT AND TRADEMARK OFFICE
CERTIFICATE OF CORRECTION

PATENT NO. : 7,027,496 B2  
APPLICATION NO. : 10/408057  
DATED : April 11, 2006  
INVENTOR(S) : Jukka Tapaninen Page 1 of 1

It is certified that error appears in the above-identified patent and that said Letters Patent is hereby corrected as shown below:

In column 7, line 46, delete "discontinuos" and replace it with --discontinuous--.

In column 7, line 48, delete "unstransmitted" and replace it with --untransmitted--.

In column 8, line 67, delete "discontinuos" and replace it with --discontinuous--.

In column 9, line 3, delete "untrasmitted" and replace it with --untransmitted--.

In column 11, line 27, delete "discontinuos" and replace it with --discontinuous--.

In column 12, line 13, delete "discontinuos" and replace it with --discontinuous--.

Signed and Sealed this

Twenty-second Day of August, 2006

JON W. DUDAS  
*Director of the United States Patent and Trademark Office*